United States Patent [19]

Tharaldson

[11] Patent Number: 5,409,344
[45] Date of Patent: Apr. 25, 1995

[54] PORTABLE GRAIN CART AUGER SYSTEM

[75] Inventor: James R. Tharaldson, Oelwein

[73] Assignee: United Farm Tools, Inc., Oelwein, Iowa

[21] Appl. No.: 206,952

[22] Filed: Mar. 7, 1994

[51] Int. Cl.[6] .............................................. B60P 1/40
[52] U.S. Cl. ........................... 414/505; 198/314; 198/550.1; 198/550.6; 198/589; 414/519; 414/523; 414/526
[58] Field of Search ............................... 414/503–505, 414/326, 523, 526, 519, 520; 198/314, 589, 550.1, 550.6, 668

[56] References Cited

U.S. PATENT DOCUMENTS

| | | | |
|---|---|---|---|
| 2,296,014 | 9/1942 | Benzel, Sr. et al. | 414/505 |
| 2,481,860 | 9/1949 | Miller | 414/523 X |
| 2,772,767 | 12/1956 | Seifert | 414/523 X |
| 3,021,025 | 2/1962 | Sudenga et al. | 414/526 X |
| 3,265,253 | 8/1966 | Niewold | 414/523 X |
| 3,273,734 | 9/1966 | Schuler | 414/504 |
| 3,337,068 | 1/1967 | Meharry | 414/523 |
| 3,477,599 | 11/1969 | De Coene | 414/526 X |
| 3,561,681 | 2/1971 | Tyler | 414/523 X |
| 3,575,306 | 4/1971 | Obermeyer et al. | 414/523 |
| 3,638,816 | 2/1972 | Mann | 414/526 X |
| 3,664,525 | 5/1972 | Herbsthofer | 414/526 X |
| 3,825,138 | 7/1974 | Pool | 414/523 X |
| 4,092,004 | 5/1978 | Leverenz et al. | 241/56 |
| 4,095,705 | 6/1978 | Hood | 414/526 X |
| 4,274,790 | 6/1981 | Barker | 414/505 X |
| 4,415,303 | 11/1983 | Westendorf et al. | 414/526 X |
| 4,427,105 | 1/1984 | Hawley et al. | 414/523 X |
| 4,646,942 | 3/1987 | Kuhns | 222/144.5 |
| 4,662,812 | 5/1987 | Busboom et al. | 414/523 |
| 4,669,945 | 6/1987 | Pollard et al. | 414/505 |
| 4,781,513 | 11/1988 | Ajögren et al. | 414/526 X |
| 4,846,621 | 7/1989 | Warsaw | 414/526 |
| 4,874,283 | 10/1989 | Hurley, Jr. | 414/523 X |
| 4,923,358 | 5/1990 | Van Mill | 414/526 X |
| 4,963,066 | 10/1990 | Boppart | 414/505 X |
| 5,013,208 | 5/1991 | Grieshop | 414/526 |
| 5,100,281 | 3/1992 | Grieshop | 414/526 |
| 5,305,866 | 4/1994 | Stewart et al. | 198/668 X |
| 5,316,431 | 5/1994 | Barber | 414/523 |

FOREIGN PATENT DOCUMENTS

| | | | |
|---|---|---|---|
| 277212 | 11/1966 | Australia | 414/326 |
| 2141520 | 8/1971 | Germany . | |
| 2412816 | 9/1975 | Germany | 414/505 |
| 1167113 | 3/1968 | United Kingdom . | |

Primary Examiner—David A. Bucci
Attorney, Agent, or Firm—James C. Nemmers

[57] ABSTRACT

A cart for transporting grain and the like and unloading the grain using an auger system. The system has two augers, a lower auger that elevates the grain from the cart's grain storage hopper and deposits it into an upper auger that carries the grain out and away from the cart for discharge at the desired place. Each auger is independently driven by a hydraulic motor. The upper auger can be swung through a wide arc thereby allowing the grain to be discharged to almost any unloading position without moving the cart. Because the upper auger is independent, the arc through which it is swung is at a relatively low angle from the horizontal and the grain therefore can be discharged a greater distance from the cart. Also, the upper auger can be swung to a position alongside the hopper for over-the-road transport of the cart.

4 Claims, 2 Drawing Sheets

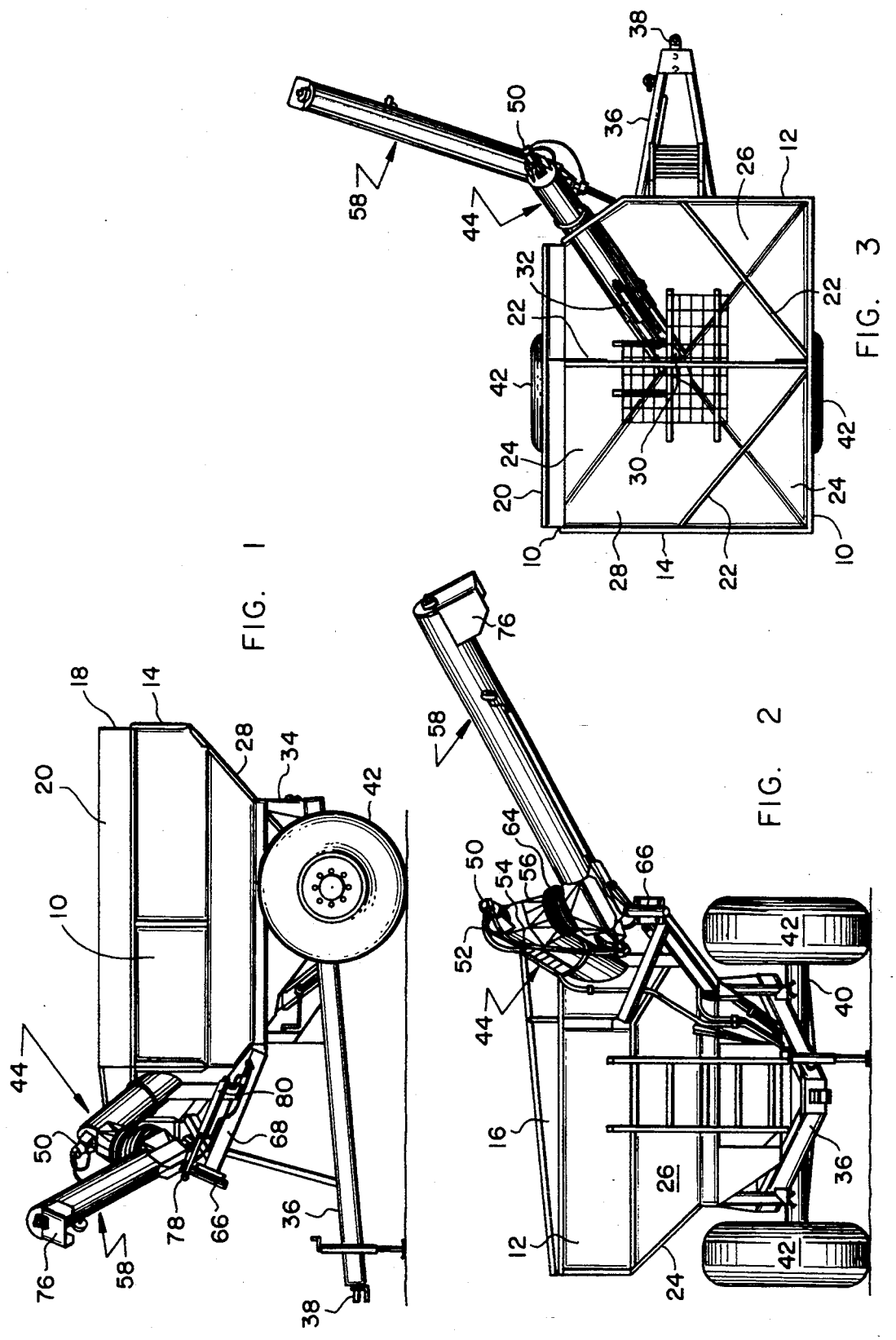

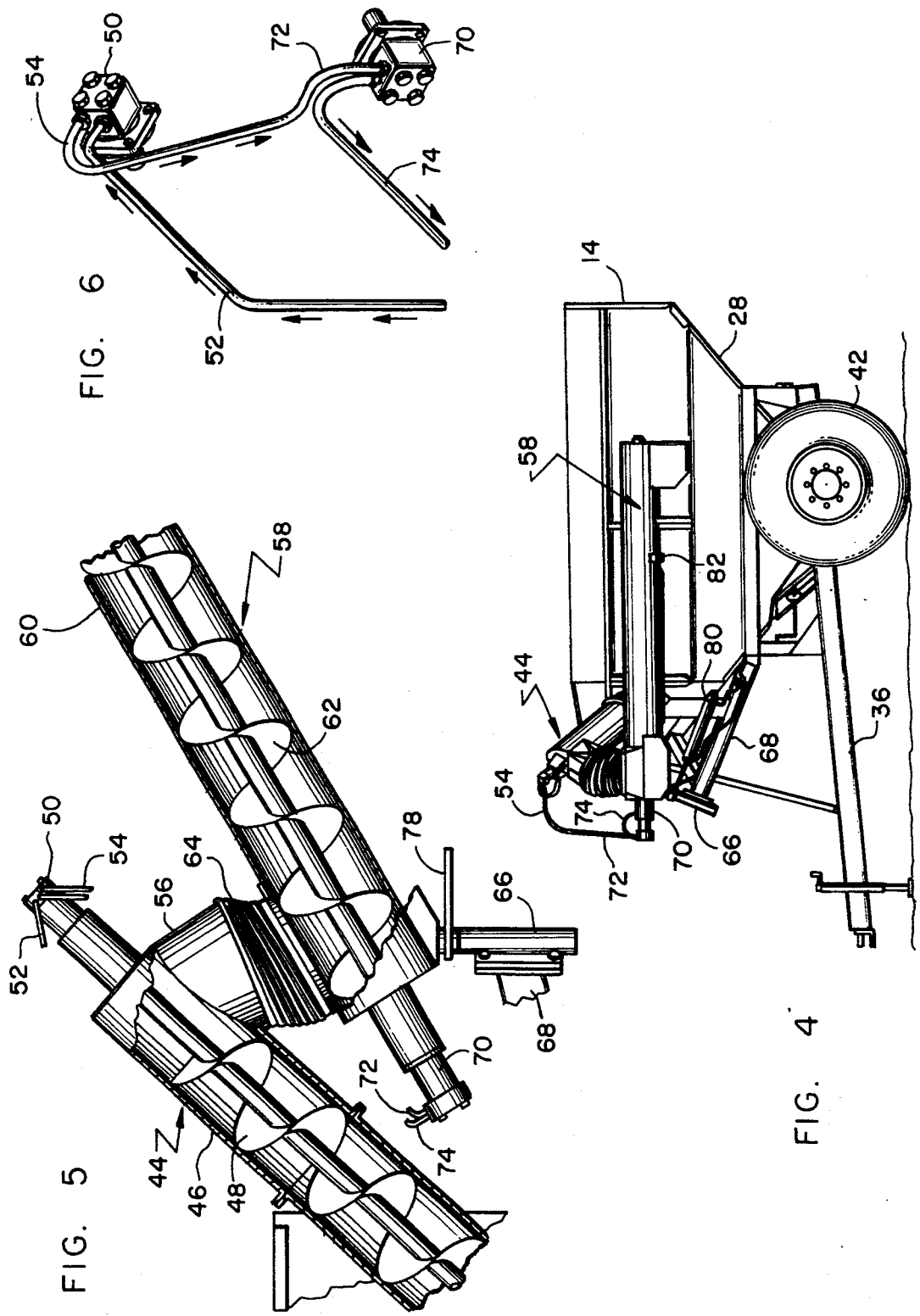

PORTABLE GRAIN CART AUGER SYSTEM

BACKGROUND OF THE INVENTION

The invention relates to a grain cart having an improved auger arrangement for removing grain from the cart.

Grain carts are typically used in combination with a combine to temporarily store the grain during harvest. The cart is generally towed by a prime mover, such as a tractor, alonside the combine to receive the grain as it is harvested by the combine. The cart is then towed to a truck where the grain is discharged from the cart into the truck for transport to a permanent storage facility, such as a grain elevator. The use of the grain cart thus improves the efficiency of the grain harvest.

As is well known to those skilled in the art, the grain is unloaded from the cart into a truck through an auger conveyor which is typically mounted on the left front corner of the cart to provide the best possible visibility for the operator during unloading. Typically, the auger is in two sections, a lower section rigidly mounted within the lower portion of the cart and a second or upper section that carries the grain upwardly to a height sufficient where it can be discharged into a truck or other storage or transport facility. Generally, the upper auger section is pivotly mounted so that it can be swung to a storage or transport position when not in use. Pivoting of the auger between the lower and upper sections requires a mechanical connection between the augers and requires a locking mechanism to keep the auger sections in place and prevent grain leakage. Illustrations of these typical auger arrangements are shown in Grieshop U.S. Pat. No. 5,013,208, Warsaw U.S. Pat. No. 4,846,621, and Barker U.S. Pat. No. 4,274,790. In all of these prior art patents, the upper section of the auger has two positions, a transport position and an extended position where the upper section is locked and joined with the lower auger section. With the auger systems of the prior art grain carts, in order to distribute the grain discharged from the cart, the cart itself must be moved since the position of the upper auger section is fixed once locked in place in its extended discharge position.

Also, typically the augers of prior art grain carts are driven from the power take off units of the tractor through shafts, universal joints, gears, chains, etc. These drive systems require a considerable amount of maintenance and present safety hazards particularly if not properly guarded.

There is therefore a need to overcome the limitations of the prior art structures by providing an auger discharge system that eliminates the problems associated with the pivotal connection between the upper and lower auger sections. There is a further need to provide an auger discharge arrangement which allows the auger to pivot to different unloading positions without moving the cart. The auger arrangement of the invention is intended to overcome the foregoing limitations and deficiencies of the prior art.

SUMMARY OF THE INVENTION

The grain cart of the invention provides an auger unloading system that employs two independently hydraulically powered augers that are connected by a gravity discharge flexible section. The lower auger is a fixed auger that elevates the grain out of the cart and discharges it into the upper auger which is swingable through a wide arc so that it can discharge the grain to various unloading positions without moving the cart. Each of the augers is independently and hydraulically driven, and the uppper auger is mounted so that it can be swung to a horizontal position during transport but swung upwardly to a higher angle for different unloading heights. Independent hydraulic powering of the two augers also allows additional power to be supplied to the lower auger where it is required.

BRIEF DESCRIPTION OF THE DRAWING

FIG. 1 is a side elevational view of a grain cart and auger discharge system constructed according to the principles of the invention;

FIG. 2 is a front elevational view of the grain cart of FIG. 1;

FIG. 3 is a top or plan view of the grain cart of the invention;

FIG. 4 is a side elevational view similar to FIG. 1 but showing the auger in a transport position;

FIG. 5 is an enlarged elevational view, partially broken away, to show the mounting and interconnection of the upper and lower augers; and FIG. 6 is a schematic diagram showing the hydraulic system for operating the augers.

DESCRIPTION OF THE PREFERRED EMBODIMENT OF THE INVENTION

Referring first to FIGS. 1, 2 and 3, there is shown a grain cart having upper substantially vertical side walls 10 joined to a front wall 12 and rear wall 14. The walls 10, 12 and 14 may typically be provided with upper extensions 16 and 18 for the front and rear walls, respectively, and an extension 20 along the left one of the side walls 10. Also, the side wall 10, front wall 12 and rear wall 14 may be provided with structural brace bars 22.

Extending downwardly and inwardly from the side walls 10 are the sloping sides 24. Similarly, a sloping front wall 26 and a sloping rear wall 28 are joined to the sloping side walls 24 to complete a hopper by which the grain falls by gravity to the lowest level. At the juncture of the sloping front wall 26 and the left sloping side wall 24, there is mounted a sliding door 30 that is operated by hydraulic cylinder 32. The door 30 provides a grain flow gate to control the discharge of the grain from the hopper. The grain flow gate provided by sliding door 30 is mounted at the left front corner because preferably the discharge auger system is mounted at this location to provide maximum visibility to the operator positioned in the towing vehicle, such as a tractor (not shown). Mounting of the auger system at this location is preferable and is common on most known commercially available grain carts.

The hopper formed by the various walls just described are mounted on a supporting frame indicated generally by the reference numeral 34 to which there is attached a tow bar 36 connectable in any suitable manner to the towing vehicle such as by a hitch 38. An axle 40 secured to the frame 34 supports a pair of ground engaging wheels 42.

The foregoing description is generally typical of a grain cart of the type commonly known and used at the present time. The invention relates to the auger system for unloading the grain from the cart through the flow gate provided by the sliding door 30.

Extending upwardly from the opening provided by the sliding door 30 is a lower auger 44. Auger 44 includes an enclosed tube 46 inside of which is the auger 48 which will move the grain from the bottom of the hopper through the flow gate provided by the sliding door 30 upwardly to a height above the top of the grain cart. This is best seen in FIGS. 1 and 2. The auger 48 is driven by a hydraulic motor 50 to and from which hydraulic fluid flows through the hoses 52 and 54 as more fully described hereinafter.

As best seen in FIG. 5, grain conveyed upwardly through the lower auger 44 is discharged through a downwardly extending discharge housing 56 that is rigidly connected to the lower auger tube 46. Mounted beneath the discharge housing 56 is the intake end of the upper auger 58 which includes auger tube 60 inside of which is the auger 62. The discharge housing 56 is connected to the intake end of the auger tube 60 through a flexible tube 64. The auger tube 60 is mounted for pivotal movement on a pivot support 66 which in turn is mounted on a support member 68 affixed to the frame 34. As best seen in FIGS. 1 and 4, the pivot support 66 is at an angle for a purpose that will be evident from the description hereinafter. Auger 62 is also driven by an hydraulic motor 70 which is connected in the hydraulic system by hoses 72 and 74. The outer end of the upper auger 58 is provided with a discharge spout 76 to direct the grain downwardly when it is discharged from the upper auger 58.

As best seen in FIG. 5, an arm 78 is affixed to the lower end of the auger tube 60 just above the pivot support 66 with the outer end of arm 78 connected to hydraulic cylinder 80 that is affixed to the support member 68. Therefore, by actuating the hydraulic cylinder 80, the upper auger 58 can be swung to almost any loading position without moving the cart. Moreover, because the pivot support 66 is mounted at an angle as shown in FIGS. 1 and 4, the upper auger 58 can be swung to a transport position that is substantially horizontal with the upper auger 58 lying alongside of the left side wall 10 of the cart. FIG. 4 shows the upper auger 58 in the transport position where it rests on a suitable support 82. However, as the upper auger 58 is swung outwardly away from the side wall 10, it will swing to an increasingly higher position to accommodate different loading heights.

Referring now to FIG. 6, there is schematically shown a portion of the hydraulic system for the lower auger 44 and upper auger 58. Hydraulic fluid from the hydraulic system of the tractor or other towing vehicle flows into the system through hose 52 and into the hydraulic motor 50. Discharge of the fluid from the hydraulic motor 50 is through hose 54 which is connected to the intake and becomes the intake hose 72 for the hydraulic motor 70 for the upper auger 58. Hose 74 carries the hydraulic fluid from the hydraulic motor 70 back to the hydraulic system of the tractor. Thus, as shown in FIG. 6, hydraulic motors 50 and 70 are connected in series. The lower auger 54 must raise the grain from the bottom of the hopper of the grain cart and thus requires more horse power than the upper auger 58. Because a constant volume of hydraulic fluid is flowing through each of the hydraulic motors 50 and 70, the hydraulic motor 50 for the lower auger 44 requires more pressure to produce the higher horsepower. Since hydraulic motor 50 is the first in the series, it will receive greater pressure, and thus provide greater horsepower, than the hydraulic motor 70.

The use and operation of the grain cart with the unique auger discharge system of the invention should be evident from the foregoing description. Because of the auger discharge system utilizes two totally independent augers, a lower fixed auger and a swingable upper auger, this allows the upper auger to swing to almost any unloading position, and allows the upper auger also to be swung during operation without moving the cart. Moreover, because the upper auger is independent, the arc through which it is swung is at a relatively low angle from the horizontal and the grain therefore can be discharged a greater distance from the cart. Also, because the two augers are independently and hydraulically driven, complex and high maintenance mechanical drive systems are eliminated. Moreover, the problems of maintaining and sealing a mechanical connection at the pivot between two augers is totally eliminated. The flexible connection between the upper and lower augers in the auger system of the invention is simple, inexpensive and easy to maintain. If the flexible tube 64 becomes worn, it can quickly, easily, and inexpensively be replaced. The auger system of the invention thus solves the maintenance and leakage problems of the prior art systems while providing the important added benefit of being able to swing the auger during operation to a variety of unloading positions. Moreover, because of the unique pivotal mounting of the upper auger, the auger is quickly and easily swung to a horizontal position for transport.

Having thus described the invention in connection with preferred embodiments thereof, it will be evident to those skilled in the art that various revisions and modifications can be made to the preferred embodiments described herein without departing from the spirit and scope of the invention. It is our intention, however, that all such revisions and modifications that are obvious to those skilled in the art will be included within the scope of the following claims.

What is claimed is as follows:

1. A grain cart for storing, transporting and discharging grain, said cart comprising: a main body open at a top and having a front wall and a rear wall joined by side walls and closed at a bottom to receive and hold grain; a supporting frame for the main body; ground engaging wheels combined with the supporting frame to provide for transport of the cart; a grain discharge door near the bottom of the body moveable from a closed position to an open position to allow grain to be discharged from the main body; a lower auger having an intake end and a discharge end with the intake end adjacent the grain discharge door to receive grain from the main body; the lower auger being fixed to the main body at a juncture of the front wall and a side wall on a left side of the cart and having an enclosed tube extending upwardly from the intake end to carry grain from the intake end to the discharge end; an upper auger having an enclosed tube with an intake end and a discharge end with the intake end of the upper auger positioned beneath the discharge end of the lower auger; a single pivot mount at the intake end of the upper auger providing for swingable movement of the upper auger about the pivot mount, a pivot axis of the mount being at an angle to the vertical so that the upper auger will be substantially horizontal when swung against a side wall of the cart for transport and the upper auger will be at an increasingly larger angle from the horizontal as the upper auger is swung away from a side wall of the cart; means for controllably swinging the upper auger to a selected position; a flexible tube connecting and sealing the discharge end of the lower auger to the intake end of the upper auger to provide for movement of grain from the lower auger to the upper auger while providing for swinging movement of the upper auger without interruption of grain flow from the lower auger to the upper auger; and separate hydraulic motors, one for the lower auger and one for the upper auger, for driving the upper and lower augers independently of each other.

2. The grain cart of claim 1 in which the hydraulic motors are connected in series and the hydraulic motor for the lower auger is upstream from the hydraulic motor for the upper auger.

3. The grain cart of claim 2 in which the means for swinging the upper auger to a selected position is an hydraulic cylinder.

4. The grain cart of claim 3 in which an hydraulic cylinder is combined with the grain discharge door to move the door from a closed position to an open position.

* * * * *